(12) United States Patent  
Barron

(10) Patent No.: US 7,726,719 B1  
(45) Date of Patent: Jun. 1, 2010

(54) PORTABLE TOOL STORAGE CONTAINER FOR USE IN PICKUP TRUCKS AND ASSOCIATED METHOD

(76) Inventor: Robert Barron, 2855 Highway 317 #760-410, Suwanee, GA (US) 30024

(*) Notice: Subject to any disclaimer, the term of this patent is extended or adjusted under 35 U.S.C. 154(b) by 576 days.

(21) Appl. No.: 11/710,337

(22) Filed: Feb. 23, 2007

Related U.S. Application Data

(60) Provisional application No. 60/775,713, filed on Feb. 23, 2006.

(51) Int. Cl.  
*B60R 9/06* (2006.01)

(52) U.S. Cl. ............. 296/37.6; 224/404; 224/405

(58) Field of Classification Search ............. 296/37.1, 296/37.6, 24.34, 3; 224/402–405, 484, 485, 224/501, 533, 536, 42.33, 42.38; 211/70.6  
See application file for complete search history.

(56) References Cited

U.S. PATENT DOCUMENTS

| | | | |
|---|---|---|---|
| 4,522,326 A | | 6/1985 | Tuohy, III |
| 5,088,636 A | * | 2/1992 | Barajas .................. 224/281 |
| 5,924,616 A | * | 7/1999 | Shives .................... 224/404 |
| 5,931,632 A | | 8/1999 | Dongilli et al. |
| 5,964,492 A | * | 10/1999 | Lyon ...................... 296/37.6 |
| 5,988,473 A | * | 11/1999 | Hagan et al. ............. 224/404 |
| 6,089,429 A | * | 7/2000 | Everson .................. 224/404 |
| 6,116,673 A | * | 9/2000 | Clonan .................... 296/37.6 |
| 6,264,083 B1 | * | 7/2001 | Pavlick et al. ............ 224/404 |
| 6,318,780 B1 | * | 11/2001 | St. Aubin ............... 296/26.09 |
| 6,460,744 B2 | | 10/2002 | Lance et al. |
| 6,464,277 B2 | * | 10/2002 | Wilding ................... 296/37.6 |
| 6,619,485 B1 | * | 9/2003 | Jenkins ..................... 211/4 |
| 6,941,654 B1 | * | 9/2005 | Sears ...................... 29/897.2 |
| 6,945,580 B1 | * | 9/2005 | Hentes .................... 296/37.6 |
| 7,017,966 B2 | * | 3/2006 | Clonan .................... 296/37.6 |
| 7,052,066 B2 | * | 5/2006 | Emery et al. ............. 296/37.1 |
| 7,128,356 B2 | * | 10/2006 | Bassett .................... 296/37.6 |
| 7,185,935 B1 | * | 3/2007 | Magarro ................... 296/37.6 |
| 7,240,942 B2 | * | 7/2007 | Grafton ................... 296/37.1 |
| 7,290,819 B2 | * | 11/2007 | Howard ................... 296/37.6 |
| 7,530,618 B2 | * | 5/2009 | Collins et al. ............ 296/37.6 |
| 2002/0014505 A1 | * | 2/2002 | Lance et al. ............... 224/404 |

* cited by examiner

*Primary Examiner*—Glenn Dayoan  
*Assistant Examiner*—Gregory Blankenship

(57) ABSTRACT

A tool storage container includes a body with top, middle, and bottom sections that is elevated above a bottom surface of a pickup truck bed during transport. The top section includes a base with a lid pivotally attached thereto, and a hollow cavity therein. The middle section is disposed below the top section, and is monolithically formed therewith. The bottom section is disposed below the middle section, and is monolithically formed with the middle section. Each of the sections includes isolated compartments for housing objects therein. A mechanism independently locks the compartments, and another mechanism transports and supports the body along a ground surface when the body is removed from the pickup truck bed. The transporting and supporting mechanism is attached to a bottom surface of the body.

15 Claims, 13 Drawing Sheets ial Appli
PORTABLE TOOL STORAGE CONTAINER FOR USE IN PICKUP TRUCKS AND ASSOCIATED METHOD

CROSS REFERENCE TO RELATED APPLICATIONS

This application claims the benefit of U.S. Provisional Application No. 60/775,713, filed Feb. 23, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to tool storage containers and, more particularly, to a portable tool storage container for use in a bed of a pickup truck for assisting a user to efficiently store and easily transport tools to and from a work area.

2. Prior Art

The vast majority of home improvement or repair jobs cannot be completed without the proper tools. In fact, it is not uncommon to find a fully stocked toolbox or chest in the garages, sheds, and utility closets of America. Additionally, many pickup truck owners also install heavy-duty, aluminum tool boxes in the bed of their trucks, so that a needed tool is always at the ready regardless of where they are. Truck bed tool boxes are typically built to hold an extensive variety of tools, so even professional tradesmen are more apt to equip a truck with a toolbox, since it allows them to easily transport all necessary supplies to any job site. However, truck bed tool boxes do present drawbacks.

Particularly, these containers are usually made with a wide open interior. As such, there are no separate compartments for different varieties of tools, and all the various sized pliers, wrenches, screwdrivers, wire cutters, drill bits, screw tips create a sea of clutter that can be difficult to manage. In addition, truck bed toolboxes are often permanently built into the body of the vehicle, and as a result, workers find themselves making repeated trips to the truck to retrieve needed tools.

One prior art example shows a storage unit adapted to be slidably coupled to a rear floor portion of a vehicle, such as a pickup truck, that may be provided with a mounting structure and a cabinet slidably coupled to the mounting structure. The storage unit may be provided with a plurality of drawers disposed in the cabinet and positioned within the cabinet between a pair of cabinet sidewalls, wherein each of the drawers is movable in a direction parallel to the width of the cabinet. The storage unit may have a cover operatively connected to the cabinet. The cover is movable between an open position in which the drawers may be opened, and a closed position in which the cover prevents the drawers from being opened. A cover latch is associated with the cover that allows the cover to be latched in its closed position. Unfortunately, this prior art example requires attachment to the inside surface of a vehicle bed, thereby marring the surface, and possibly causing further damage from rust. In addition, such installation is difficult and complicated, and may require the services of a professional.

Another prior art example shows a tool box that serves to prevent a truck owner or user from climbing in and out of the truck for tools. Primarily, it consists of a frame having rollers which are received in a pair of channels fastened to the inside of the truck bed. It further includes a pole with a hook for pulling or pushing the box, and the pole also serves to render the box stationary when the truck is in motion. Unfortunately, this prior art example does not include a plurality of wheels attached to the toolbox for allowing a user to easily transport the toolbox along a ground surface when removed from the vehicle bed.

Accordingly, a need remains for a portable tool storage container for use in pickup trucks and the like in order to overcome the above-noted shortcomings. The present invention satisfies such a need by providing an apparatus that is convenient and easy to use, is lightweight yet durable in design, and assists a user to efficiently store and easily transport tools to and from a work area. Such an apparatus provides consumers with a more effective means of tool organization and management. The apparatus offers storage for items as small as drill bits and as large as wrenches, and can be attached to, and removed from, the bed of a truck in a short time with very little effort. The present invention is simple to use, inexpensive, and designed for many years of repeated use.

BRIEF SUMMARY OF THE INVENTION

In view of the foregoing background, it is therefore an object of the present invention to provide an apparatus for a portable tool storage container for use in a bed of a pickup truck. These and other objects, features, and advantages of the invention are provided by a portable tool storage container for use in a bed of a pickup truck for assisting a user to efficiently store and easily transport tools to and from a work area.

The apparatus includes a body including vertically stacked top, middle, and bottom sections respectively. Such a body is advantageously elevated above a bottom surface of the pickup truck bed while positioned within the bed of the pickup truck.

Such a top section includes a base with a lid pivotally attached thereto. Such a base effectively defines a hollow cavity therein, and the lid fully encloses the cavity when the lid is biased forwardly and downwardly toward the base. The top section further includes a plurality of handles monolithically formed on outer surfaces of opposite ends of the base. Such handles are conveniently oriented perpendicular to a longitudinal length of the body and advantageously rest exterior of the pickup truck bed so that the user can effectively lift and remove the body while conveniently standing exterior of the pickup truck bed. Left and right fastening members are integrally attached to a top surface of the lid for effectively securing an existing ladder to the lid. Such left and right fastening members are hook-shaped and linearly displaceable along the longitudinal length of the body, and face in opposite directions and toward the opposite ends of the base. The left and right fastening members project upwardly from the top surface of the lid and are oriented at a right angle thereto.

Such a middle section is conveniently disposed below the top section. The middle section is monolithically formed with the top section and has a top surface effectively defining a bottom surface of the top section. The middle section further includes a plurality of drawers slidably positioned within a front face of the compartments of the middle section and displaceable along a path effectively defined orthogonally to the longitudinal length of the base. A plurality of linear and coextensively shaped guide rails rests directly on top edges of the pickup truck bed. Each of such guide rails is conveniently provided with a linear slot formed within an interior face thereof, and advantageously extends along a major longitudinal length of the pickup truck bed.

A plurality of flange members is monolithically formed on outer surfaces of opposite ends of the middle section, and are oriented parallel to the longitudinal length of the body. Such flange members are slidably interfitted directly within the slots such that a travel path of the body is effectively defined by respective lengths of the slots, and the body is thereby prohibited from vertically oscillating during movement of the pickup truck.

Such a bottom section is conveniently disposed below the middle section. The bottom section is monolithically formed with the middle section and has a top surface effectively defining a bottom surface of the middle section. The bottom section further includes a plurality of drawers linearly positioned within the compartments formed within the bottom section for housing various objects placed therein by a user. Each of the top, middle and bottom sections advantageously includes isolated compartments for housing objects therein.

The apparatus further includes a mechanism for independently locking the compartments such that selected ones of the compartments may be conveniently accessed while remaining ones of the compartment are effectively locked. Such a locking mechanism includes a locking apparatus attached to an outer surface of the base, the lid, and the drawers respectively, and a key for locking and unlocking the locking apparatus of the base, the lid, and the drawers respectively.

The apparatus further includes a mechanism for effectively transporting and supporting the body along a ground surface when the body is removed from the pickup truck bed. Such a transporting and supporting mechanism further supports the body in a substantially horizontal position above a ground surface when the body is removed from the pickup truck bed. The transporting and supporting mechanism is conveniently attached to a bottom surface of the body.

The transporting and supporting mechanism includes a plurality of wheels located at a distal end of the body. Such wheels are pivotally attached to a bottom surface of the bottom section and extend downwardly away therefrom and toward a ground surface during transport. The wheels are biased inwardly toward a centrally registered longitudinal axis of the body and upwardly toward the bottom surface when the body is secured to the pickup truck bed, and the wheels advantageously lay horizontally adjacent to the bottom surface when biased toward the longitudinal axis of the body.

The transporting and supporting mechanism further includes a U-shaped stand located at a proximal end of the body and oppositely seated from the wheels. Such a stand has an open end pivotally attached to the bottom surface of the body and a closed end formed oppositely of the open end. The stand is biased inwardly toward the wheels and upwardly toward the bottom surface when the body is secured to the pickup truck bed, and the stand advantageously lays horizontally adjacent to the bottom surface when biased toward the wheels. The wheels cooperate with the stand to effectively support the body above the ground surface when the body is removed from the pickup truck bed.

A method for storing and transporting tools to and from a work area includes the steps of providing a body including vertically stacked top, middle, and bottom sections respectively, independently locking the compartments (herein described below) such that selected ones of the compartments may be accessed while remaining ones of the compartments are locked, transporting and supporting the body along a ground surface when the body is removed from the pickup truck bed such that the body is maintained in a substantially horizontal position above a ground surface when the body is removed from the pickup truck bed, and linearly positioning a plurality of drawers within the compartments formed within the bottom section for housing various objects placed therein by a user.

The body is elevated above a bottom surface of the pickup truck bed during transport, and the top section includes a base with a lid pivotally attached thereto. Such a base defines a hollow cavity therein, and the lid fully encloses the cavity when the lid is biased forwardly and downwardly toward the base. The middle section is disposed below the top section, is monolithically formed with the top section, and has a top surface defining a bottom surface of the top section. The bottom section is disposed below the middle section, is monolithically formed with the middle section, and has a top surface defining a bottom surface of the middle section. Each of the top, middle and bottom sections includes isolated compartments for housing objects therein.

The method further includes the steps of attaching a locking apparatus to an outer surface of the base, the lid, and the drawers respectively, providing a key for locking and unlocking the locking apparatus, inwardly pivoting a plurality of wheels (herein described below) located at a distal end of the body such that the wheels are biased inwardly toward a centrally registered longitudinal axis of the body and upwardly toward a bottom surface of the body when the body is secured to the pickup truck bed, horizontally laying the wheels adjacent to the bottom surface when the wheels are biased toward the longitudinal axis of the body, and horizontally biasing the stand (herein described below) inwardly toward the wheels and upwardly toward the bottom surface when the body is secured to the pickup truck bed.

The U-shaped stand is located at a proximal end of the body and oppositely seated from the wheels, and lays horizontally adjacent to the bottom surface when biased toward the wheels. The wheels are pivotally attached to the bottom surface and extend downwardly away therefrom and toward a ground surface during transport, while the stand has an open end pivotally attached to the bottom surface and a closed end formed oppositely of the open end. The wheels cooperate with the stand to support the body above the ground surface when the body is removed from the pickup truck bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
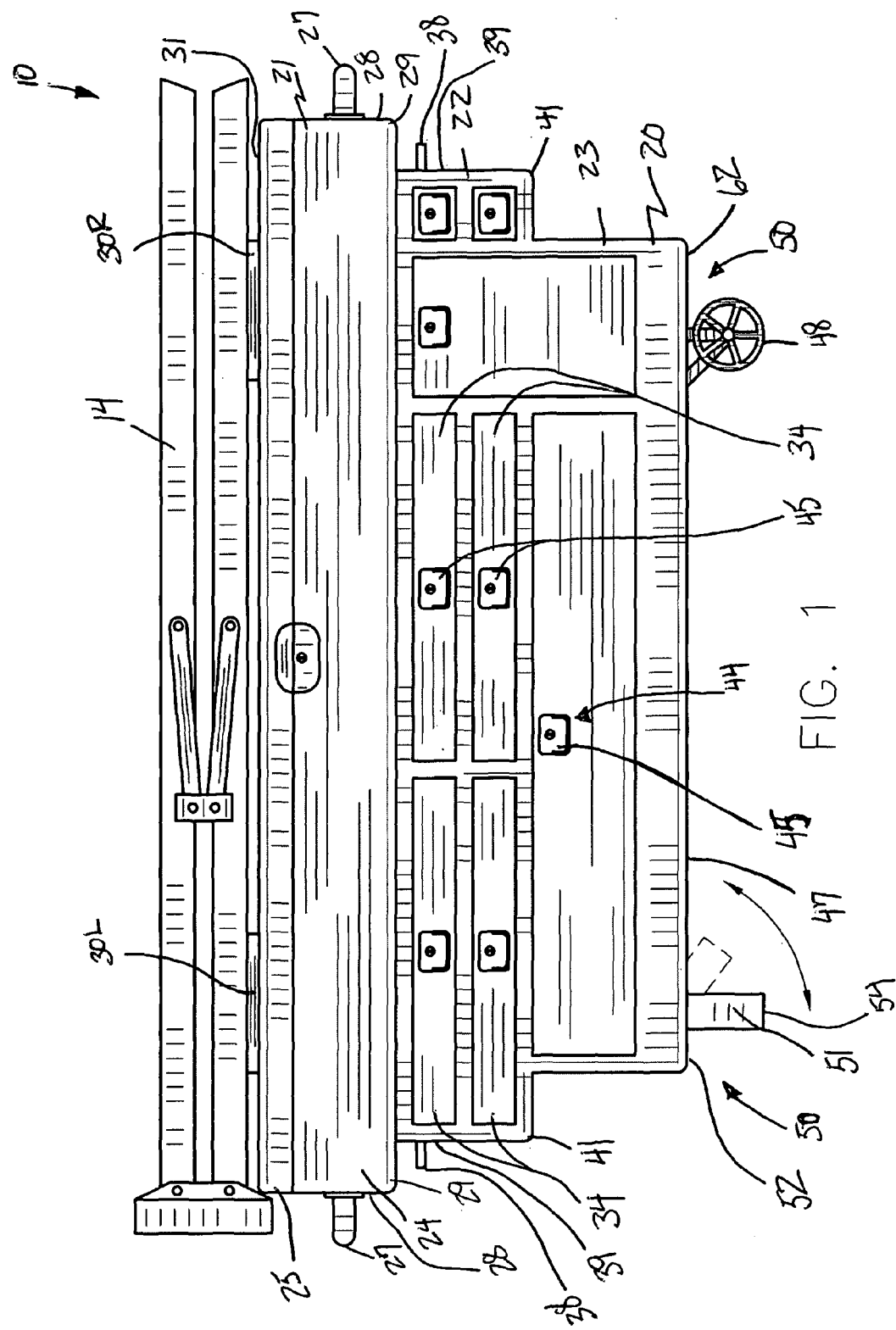
FIG. 1 is a side elevational view showing a portable tool storage container with an associated ladder seated thereon, in accordance with the present invention.
Figure 2:
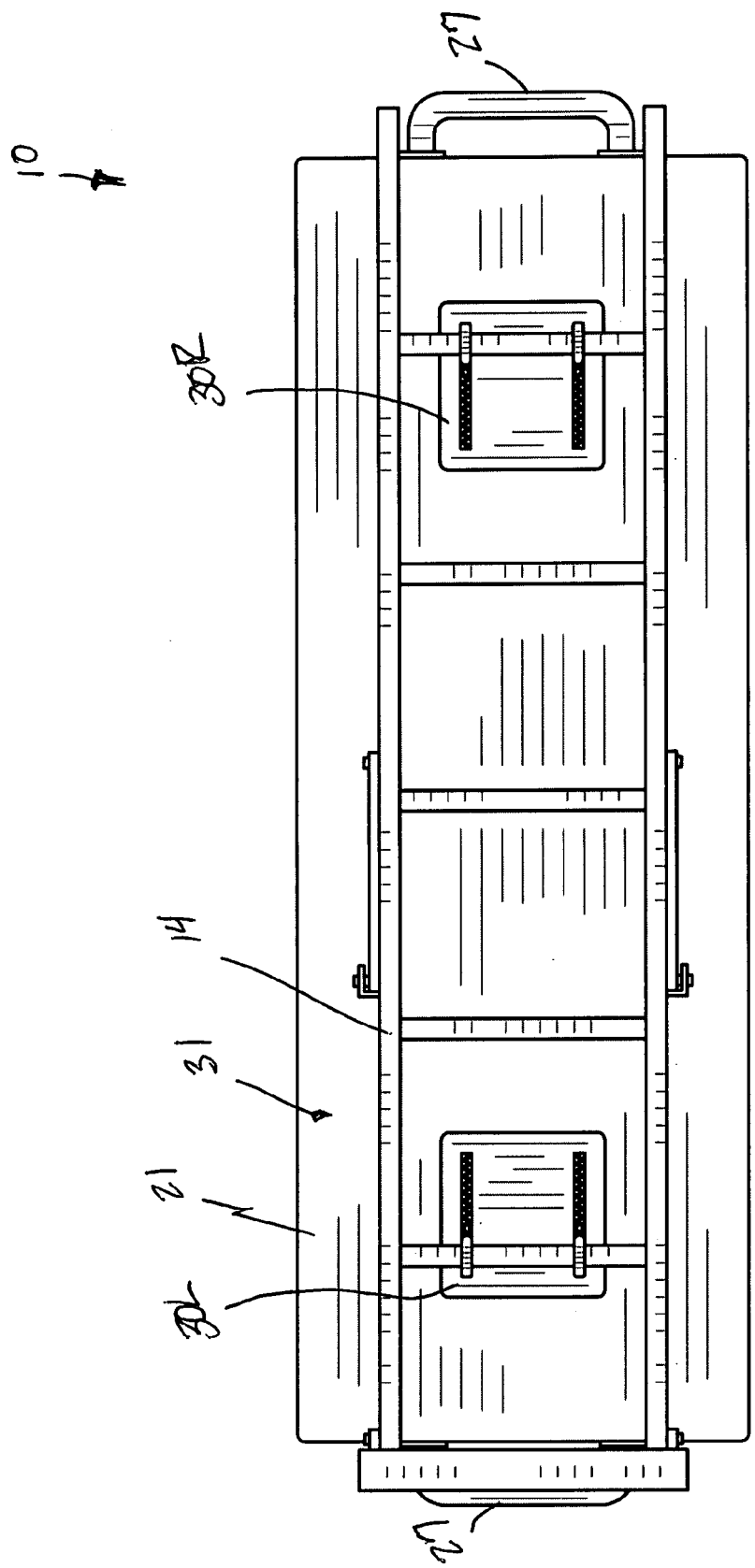
FIG. 2 is a top plan view of FIG. 1 showing the fastening members attached to the ladder rungs.
Figure 3:
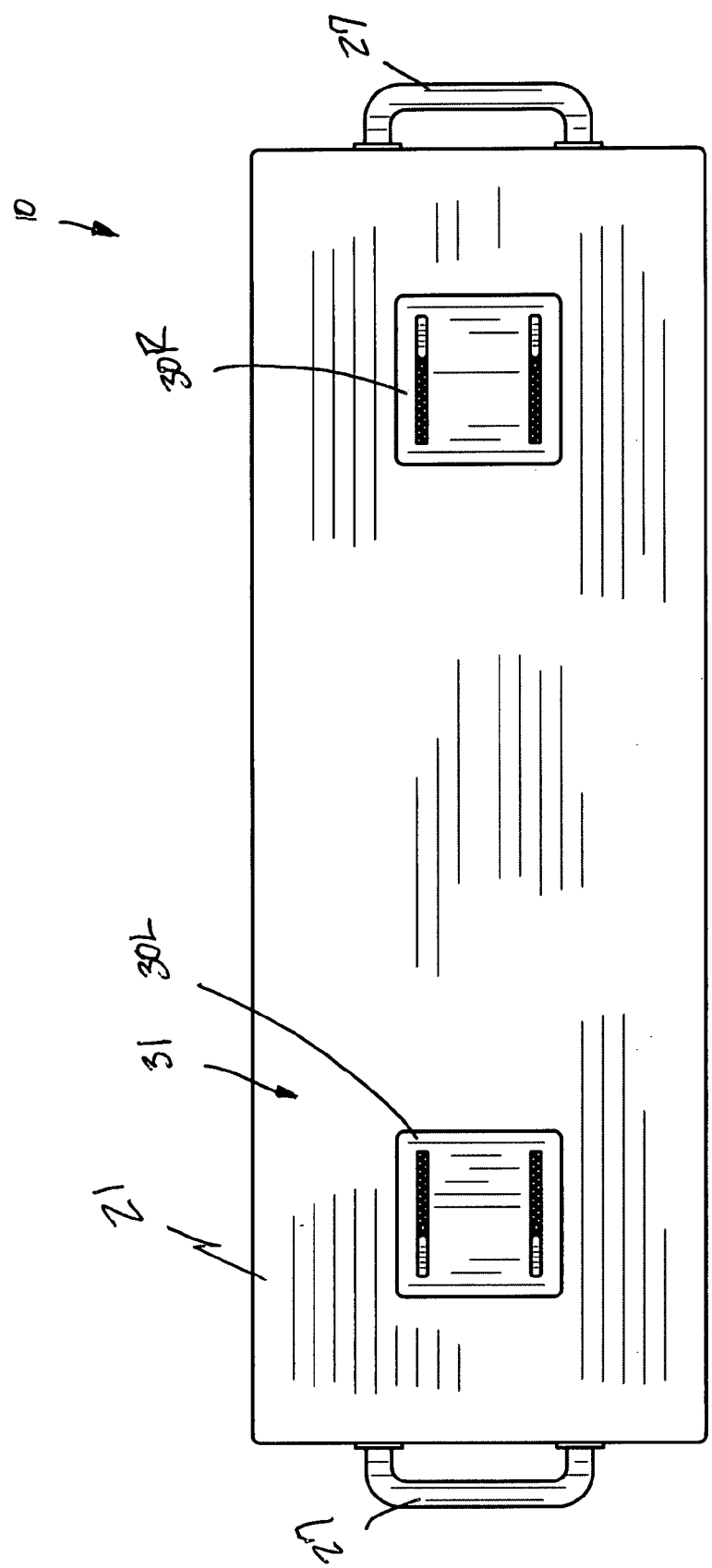
FIG. 3 is a top plan view of FIG. 1 showing the ladder removed from the fastening members of the storage container.
Figure 4:
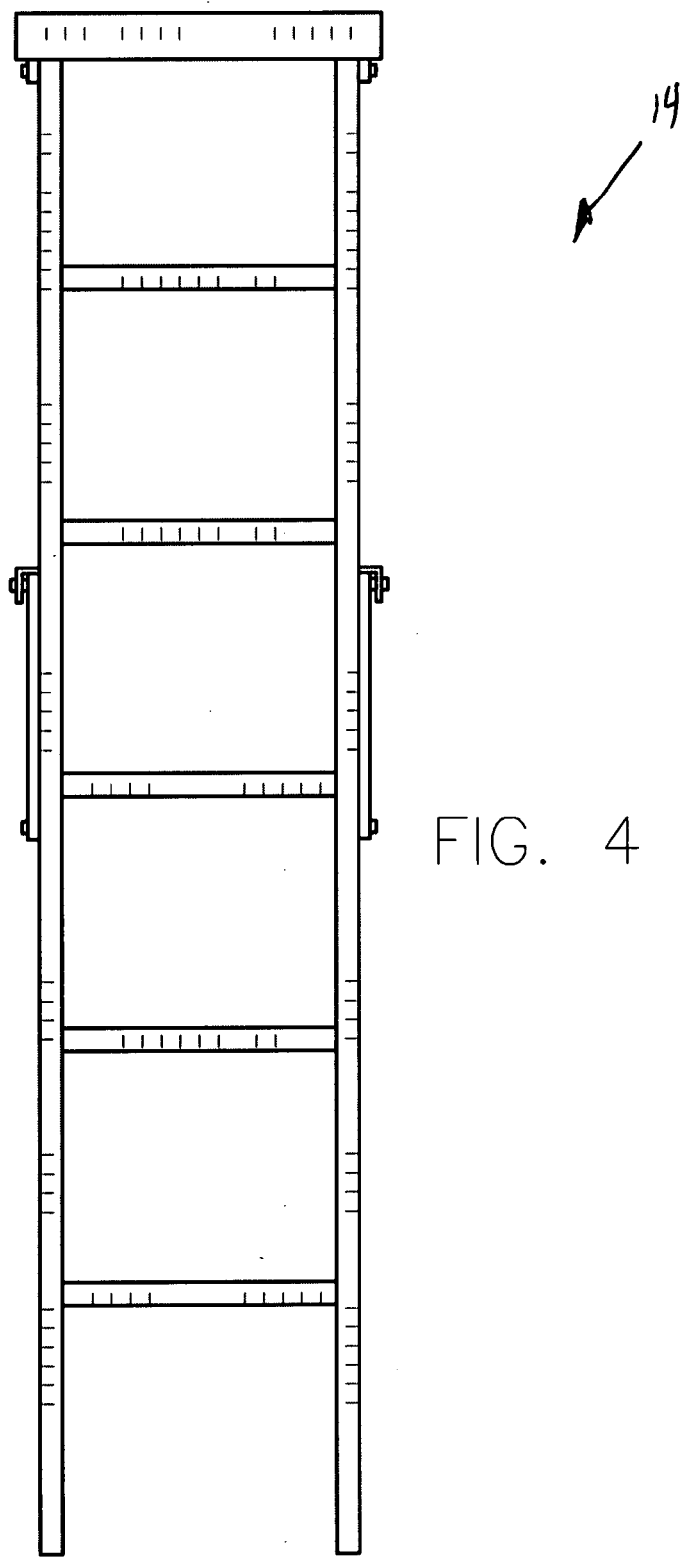
FIG. 4 is a front elevational view of the ladder shown in FIG. 1.
Figure 5:
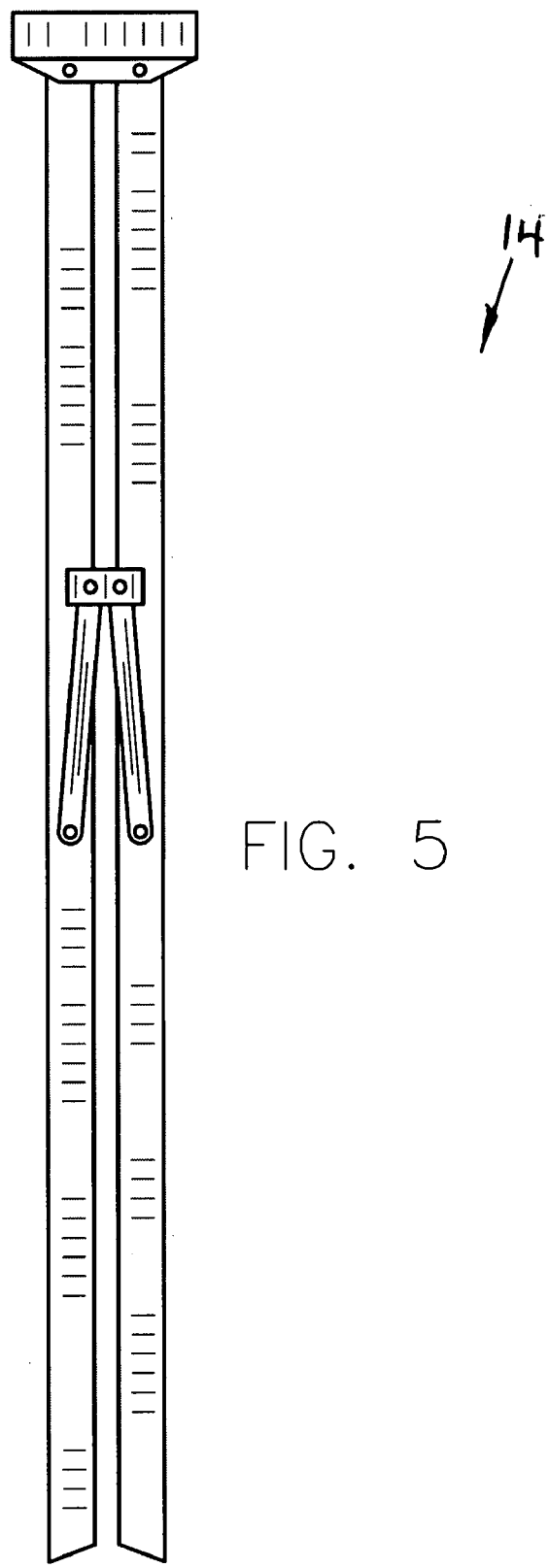
FIG. 5 a side elevational view of the ladder shown in FIG. 4.
Figure 6:
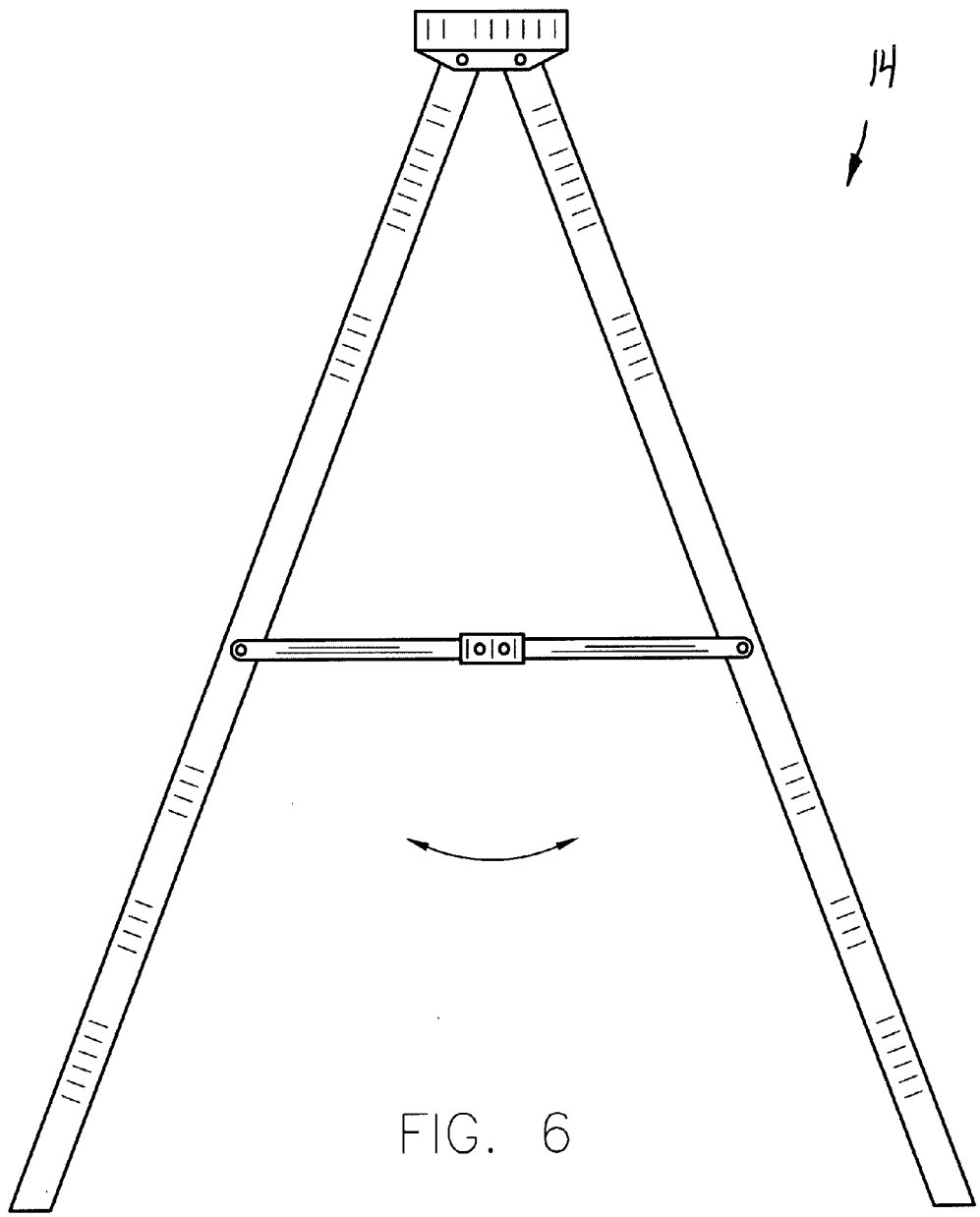
FIG. 6 a side elevational view of the ladder shown in FIG. 4, adapted to an unfolded position.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-12 by the reference numeral 10 and is intended to provide a portable tool storage container for use in a bed of a pickup truck. It should be understood that the apparatus 10 may be used to store many different types of items in many different types of vehicles and should not be limited in use to storing only those types of items in those types of vehicles described herein.

Referring to FIGS. 1, 2, 3, 7, 8, 9, 10, 11 and 12, the apparatus 10 includes a body 20 including vertically stacked top 21, middle 22, and bottom 23 sections respectively. Such a body 20 is sized and shaped appropriately to fit within the bed 11 of a traditional pickup truck 12. In addition, the body 20 is advantageously elevated above a bottom surface 13 of the pickup truck bed 11 while positioned within the bed 11 of the pickup truck 12. Such elevation of the body 20 allows the body 20 to have unimpeded linear motion as desired by a user while attached to the slots 40 (herein described below), as well as protecting the transporting and supporting mechanism 50 (herein described below) from damage while the body 20 is secured to the slots 40.

Referring to FIGS. 1, 2, 3, 7, 8, 9, 10, 11 and 12, such a top section 21 includes a base 24 with a lid 25 pivotally attached thereto. Such a base 24 defines a hollow cavity 26 therein, and the lid 25 fully encloses the cavity 26 when the lid 25 is biased forwardly and downwardly toward the base 24. Such a cavity 26 is designed to house larger sized tools and electrical cords, as examples. The top section 21 further includes a plurality of handles 27 monolithically formed on outer surfaces 28 of opposite ends 29 of the base 20. Such handles 27 are oriented perpendicular to a longitudinal length of the body 20 and advantageously rest exterior of the pickup truck bed 11, which is essential such that the user can lift and remove the body 20 while standing exterior of the pickup truck bed 11. In addition, the placement of the handles 27 does not impede the linear motion of the body 20, and does not risk damage to the handles 27 during such motion.

Referring to FIGS. 1, 2, 3, 4, 5, 6, 8, 9, 10, 11 and 12, left 30L and right 30R fastening members are integrally attached to a top surface 31 of the lid 25 for securing an existing ladder 14 to the lid 25. Such left and right fastening members 30L, 30R are hook-shaped and linearly displaceable along the longitudinal length of the body 20, and face in opposite directions and toward the opposite ends 29 of the base 24. The left and right fastening members 30L, 30R project upwardly from the top surface 31 of the lid 25 and are oriented at a right angle thereto. Such left and right fastening members 30L, 30R allow a user to secure an existing ladder 14, or other similar type object, to the lid 25 during movement of the pickup truck 12, thereby allowing a user to transport additional items safely and securely.

Referring to FIGS. 1, 7, 8, 9, 10 and 12, such a middle section 22 is disposed below the top section 21. The middle section 22 is monolithically formed with the top section 21 and has a top surface 32 defining a bottom surface 33 of the top section 21. The middle section 22 further includes a plurality of drawers 34 slidably positioned within a front face of the compartments 35 of the middle section 22 and displaceable along a path defined orthogonally to the longitudinal length of the base 20. Such drawers 34 are differently shaped, which is critical for allowing a user to house differently sized and shaped items in separate drawers 34 and thereby keep the items organized and readily available.

Figure 10:
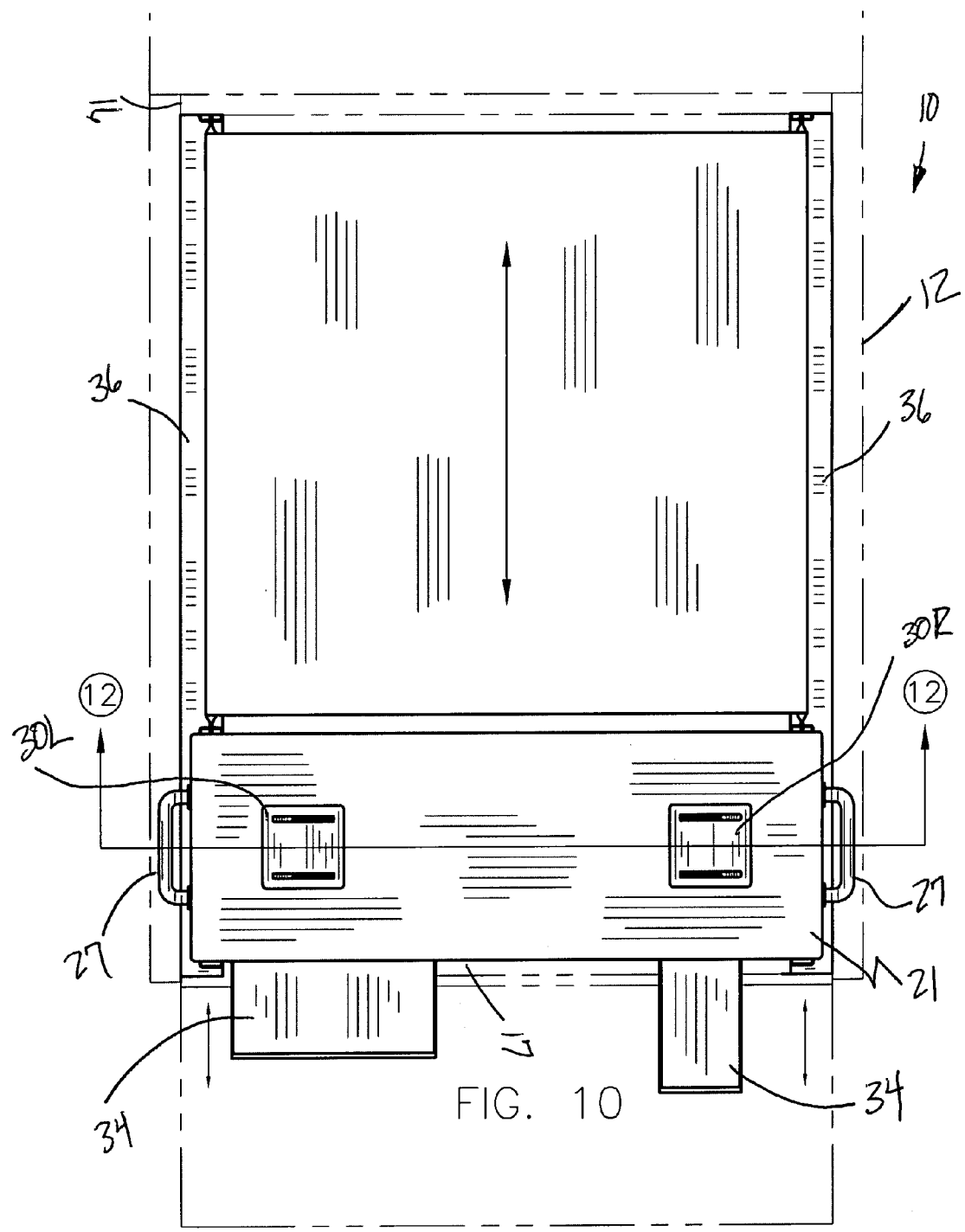
FIG. 10 is a top plan view showing the present invention seated at a tailgate section of a pickup truck bed.
Figure 11:
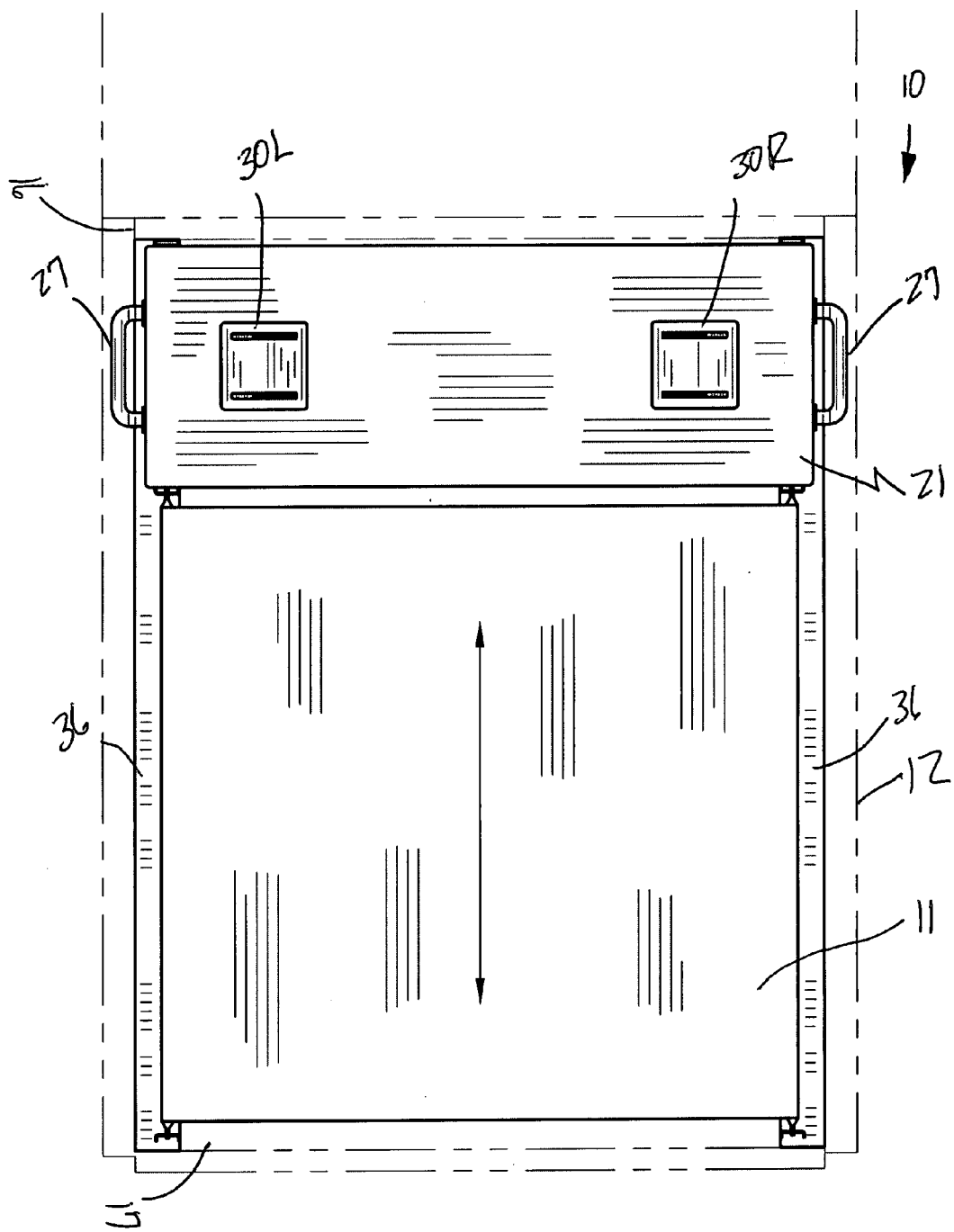
FIG. 11 is a top plan view showing the present invention seated at a passenger section of the pickup truck.
Figure 12:
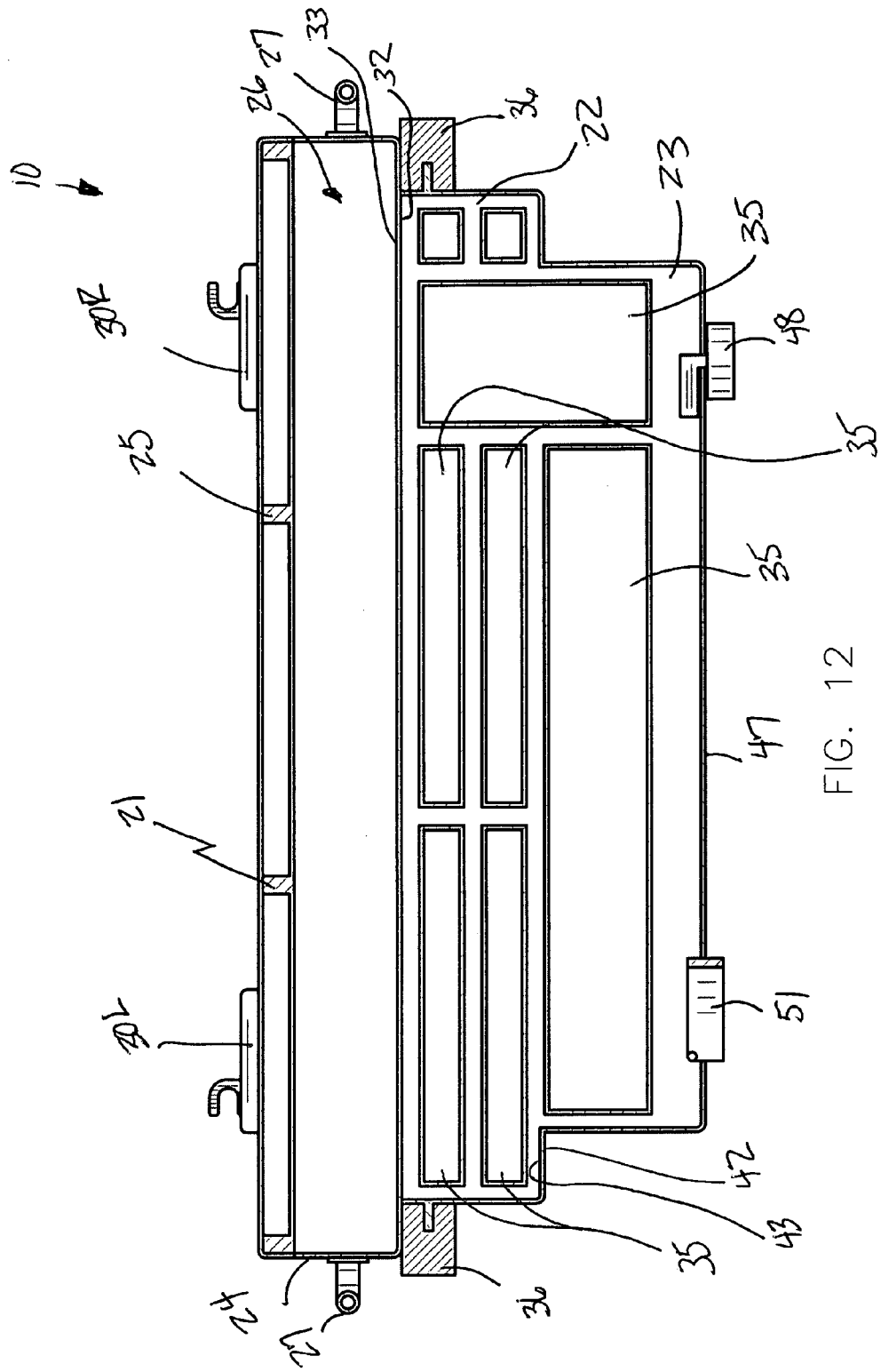
FIG. 12 is a cross-sectional view of the storage container showing the isolated compartments formed within the top, middle and bottom sections of the present invention.
Figure 13:
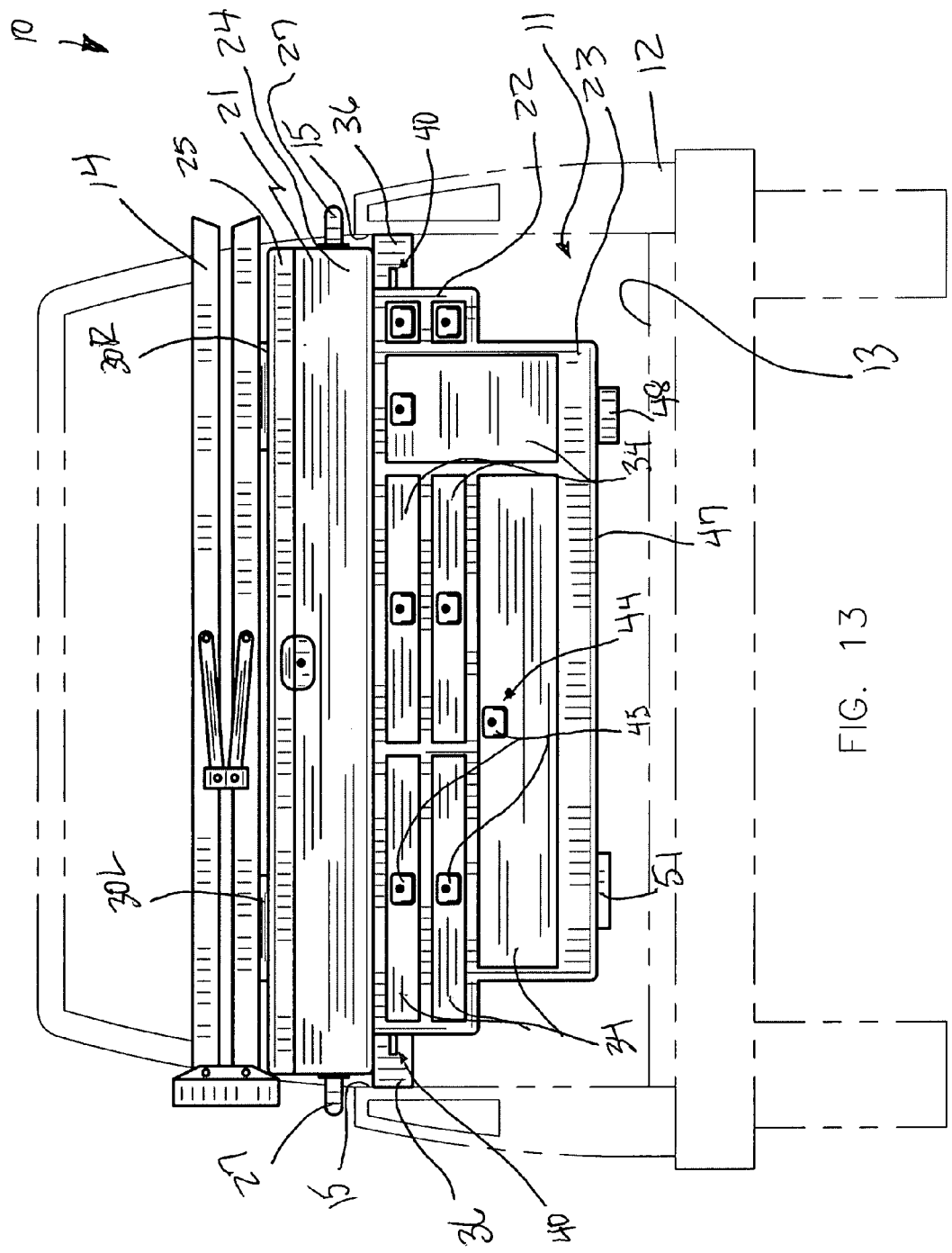
FIG. 13 is a front elevational view of the storage container secured within the bed of a pickup truck.

Referring to FIGS. 10, 11 and 12, a plurality of linear and coextensively shaped guide rails 36 rests directly on top edges 15 of the pickup truck bed 11, without the use of intervening elements. Each of such guide rails 36 is provided with a linear slot 40 formed within an interior face thereof, and advantageously extends along a major longitudinal length of the pickup truck bed 11. Such slots 40 allow a user to linearly move the body 20 to proximal 16 and distal 17 ends of the pickup truck bed 11 as desired.

Referring to FIGS. 1, 2, 7, 8 and 12, a plurality of flange members 38 is monolithically formed on outer surfaces 39 of opposite ends 41 of the middle section 22, and are oriented parallel to the longitudinal length of the body 20. Such flange members 38 extend outwardly from the opposite ends 41 of the middle section 22, and are slidably interfitted directly within the slots 40, without the use of intervening elements, such that a travel path of the body 20 is defined by respective lengths of the slots 40. The body 20 is thereby prohibited from vertically oscillating during movement of the pickup truck 12. Such prohibition of vertical movement prevents damage to the contents of the body 20, as well as helps to maintain the body 20 in a stable position during movement of the pickup truck 12.

Referring to FIGS. 1, 7, 9 and 12, such a bottom section 23 is disposed below the middle section 22. The bottom section 23 is monolithically formed with the middle section 22 and has a top surface 42 defining a bottom surface 43 of the middle section 22. The bottom section 23 further includes a plurality of drawers 34 linearly positioned within the compartments 35 formed within the bottom section 23 for housing various objects placed therein by a user. Such drawers 34 function substantially similarly to the drawers 34 positioned in the middle section 22.

Figure 7:
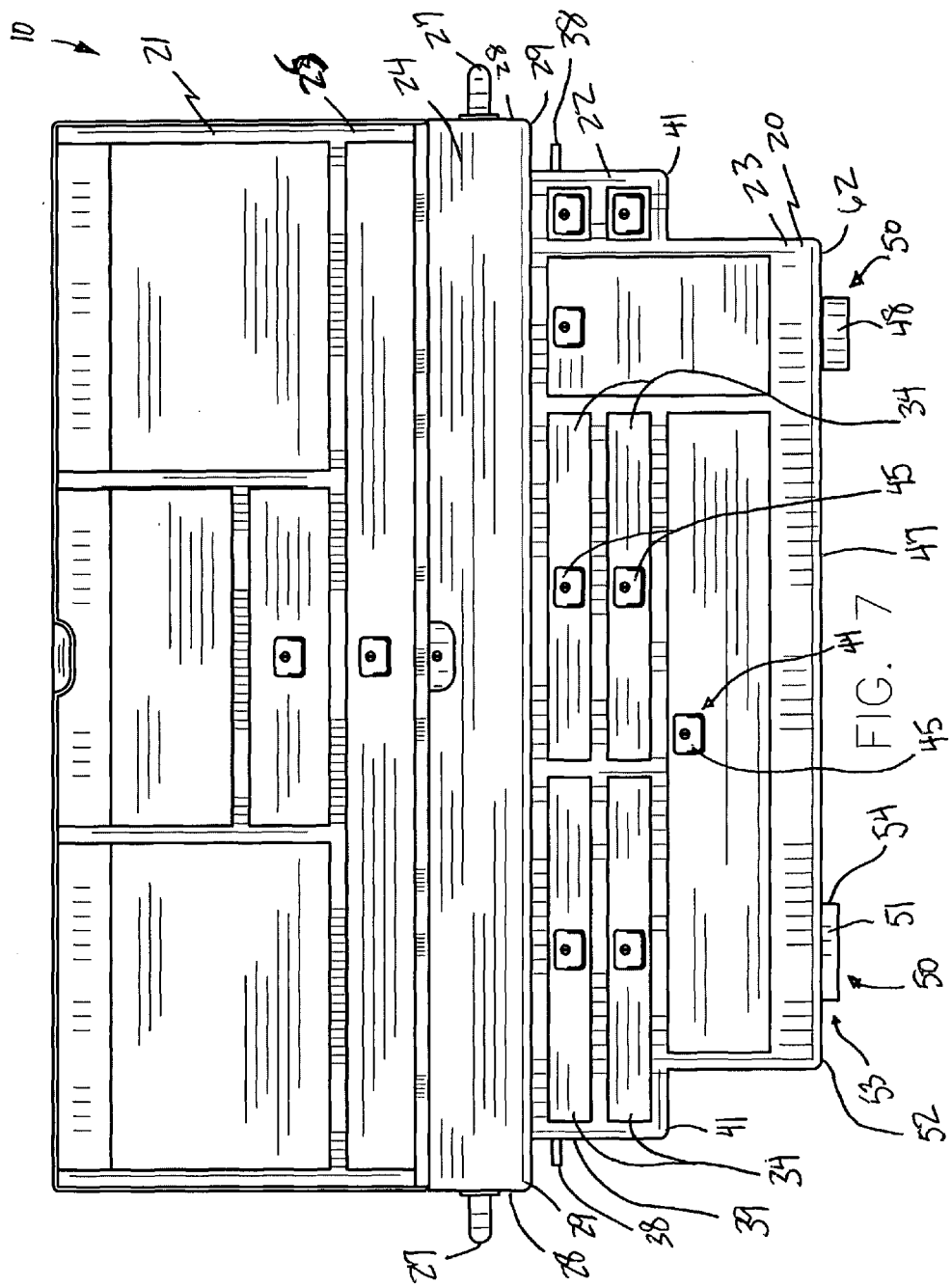
FIG. 7 is a front elevational view of the storage container showing a plurality of drawers nested within the compartments of the top, middle and bottom sections.
Figure 8:
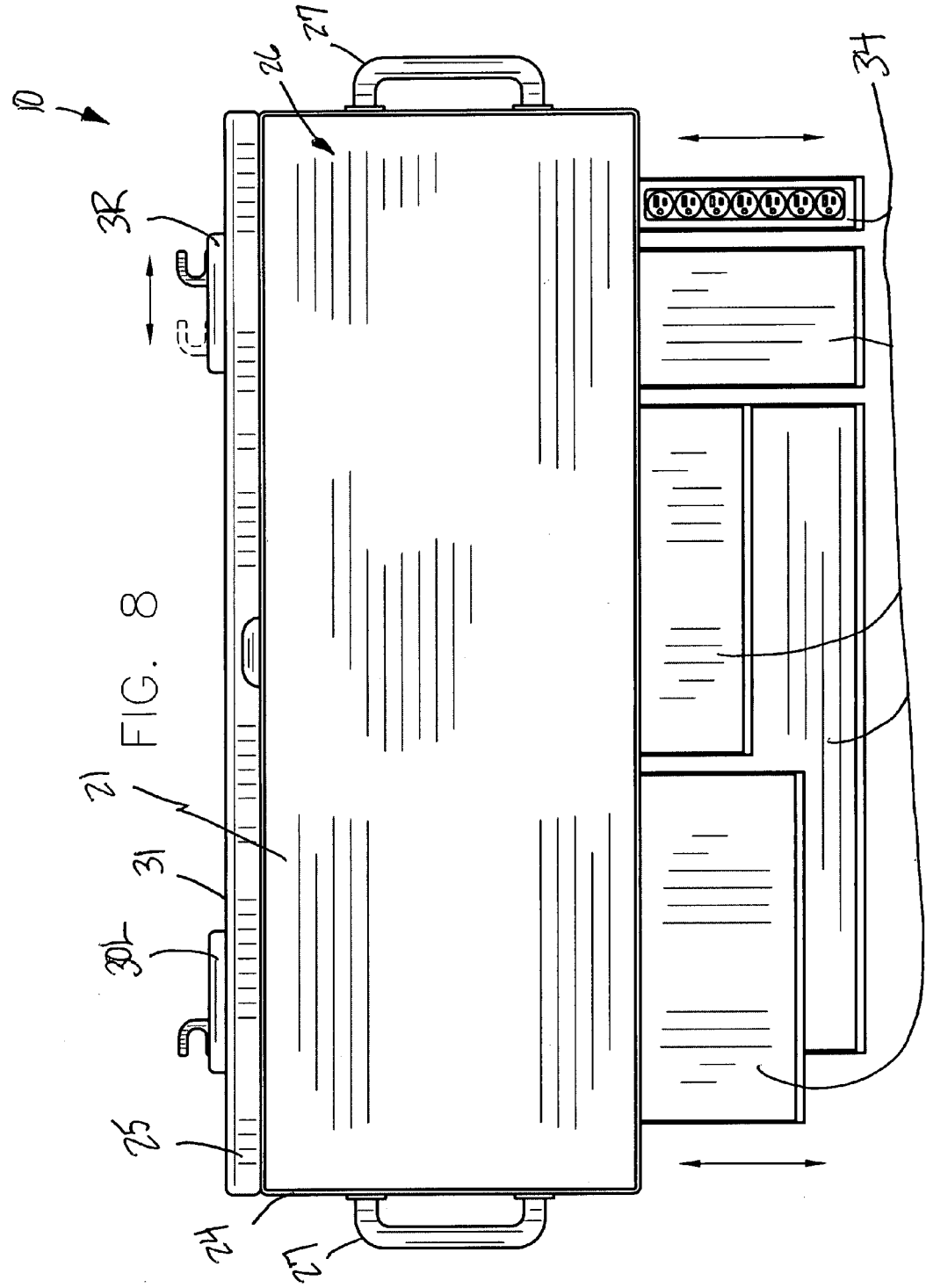
FIG. 8 is a top plan view of FIG. 7 showing selected ones of the drawers extracted to open positions.
Figure 9:
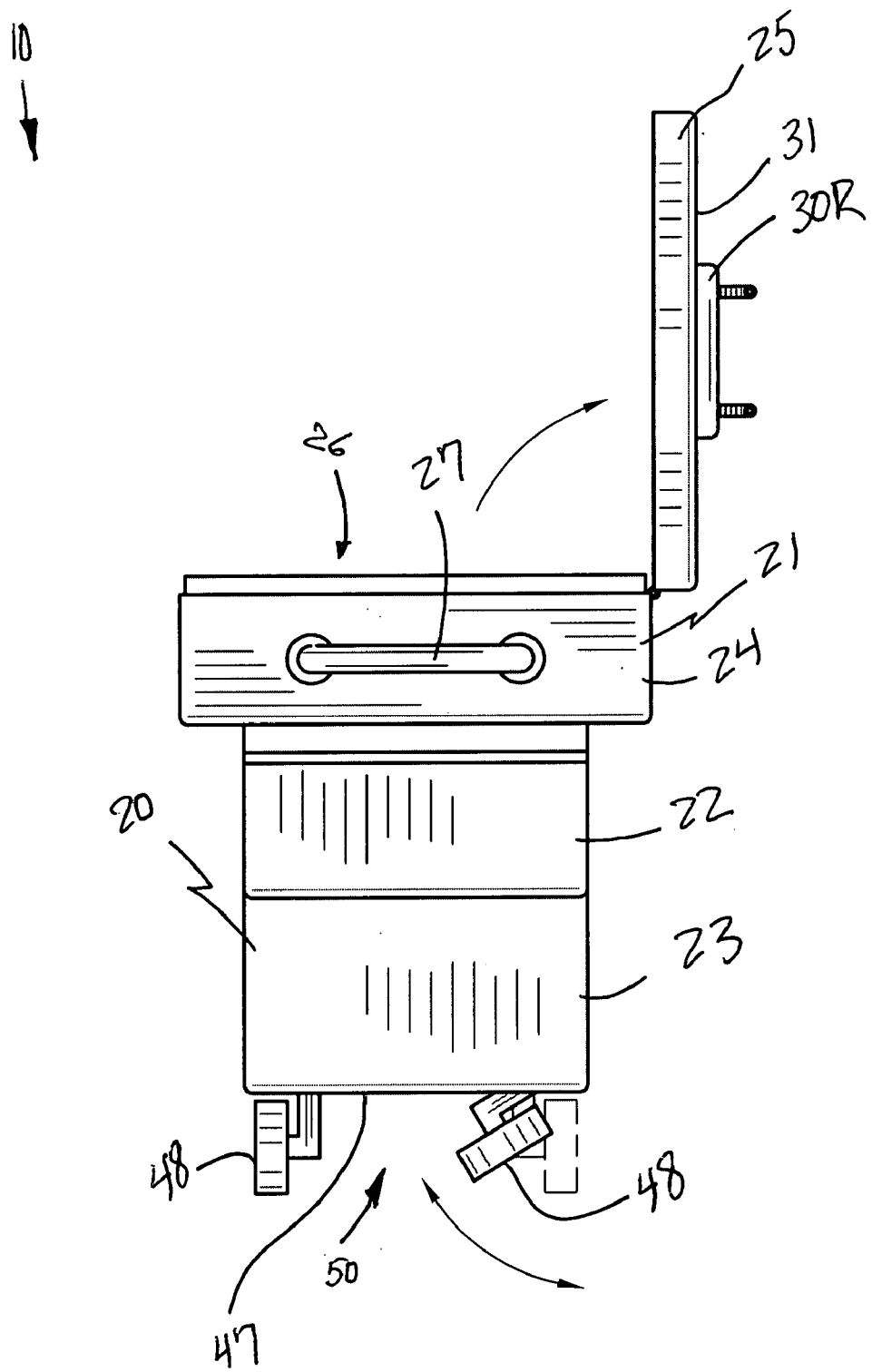
FIG. 9 is a side elevational view of the present invention showing pivotal wheels and a pivotal lid.

Referring to FIGS. 1, 7 and 12, the apparatus 10 further includes a mechanism 44 for independently locking the compartments 35, which is crucial such that selected ones of the compartments 35 may be accessed while remaining ones of the compartment 35 are locked. Such selectivity allows a user to quickly and easily access only the drawer 34 or drawers 34 desired while keeping the other drawers 34 safely closed and secured. Such a locking mechanism 44 includes a locking apparatus 45 attached to an outer surface of the base 20, the lid 25, and the drawers 34 respectively, and a key for locking and unlocking the locking apparatus 45 of the base 20, the lid 25, and the drawers 34 respectively.

Referring to FIGS. 1, 7, 9 and 12, the apparatus 10 further includes a mechanism 50 for transporting and supporting the body 20 along a ground surface when the body 20 is removed from the pickup truck bed 11. Such a transporting and supporting mechanism 50 further supports the body 20 in a substantially horizontal position above a ground surface when the body 20 is removed from the pickup truck bed 11, and is attached to a bottom surface 47 of the body 20. The transporting and supporting mechanism 50 allows a user to remove the body 20 from the bed 11 of the pickup truck 12, fold down the wheels 48 (herein described below), and pull or push the apparatus 10 along a ground surface. Once the user reaches the desired destination, the user can fold down the stand 51 (herein described below), and support the apparatus 10 in a substantially horizontal position. The user can then access the tools contained within the body 20 as needed.

Again referring to FIGS. 1, 7, 9 and 12, the transporting and supporting mechanism 50 includes a plurality of wheels 48 located at a distal end 62 of the body 20. Such wheels 48 are pivotally attached to the bottom surface 47 of the bottom section 23 and extend downwardly away therefrom and toward a ground surface during transport. The wheels 48 are biased inwardly toward a centrally registered longitudinal axis of the body 20 and upwardly toward the bottom surface 47 when the body 20 is secured to the pickup truck bed 11, and the wheels 48 advantageously lay horizontally adjacent to the bottom surface 47 when biased toward the longitudinal axis of the body 20. The position of the wheels 48 while the body 20 is secured within the bed 11 of the pickup truck 12 prevents damage to the wheels 48, as described above.

Yet again referring to FIGS. 1, 7, 9 and 12, the transporting and supporting mechanism 50 further includes a U-shaped stand 51 located at a proximal end 52 of the body 20 and oppositely seated from the wheels 48. Such a stand 51 has an open end 53 pivotally attached to the bottom surface 47 of the body 20 and a closed end 54 formed oppositely of the open end 53. The stand 51 is biased inwardly toward the wheels 48 and upwardly toward the bottom surface 47 when the body 20 is secured to the pickup truck bed 11, and the stand 51 advantageously lays horizontally adjacent to the bottom surface 47 when biased toward the wheels 48. The position of the stand 51 while the body 20 is secured within the bed 11 of the pickup truck 12 prevents damage to the stand 51, as described above. The wheels 48 cooperate with the stand 51 to support the body 20 above the ground surface when the body 20 is removed from the pickup truck bed 11, and the wheels 48 and the stand 51 are simultaneously biased to an extended position.

In use, the portable tool storage container for use in the bed of a pickup truck is simple and straightforward to use. First a user collects all the tools and places them in the appropriate drawer 34 or cavity 26 of the apparatus 10. Next, the apparatus 10 is lifted into the bed 11 of the pickup truck 12 with the body 20 resting on the top edges 15 of the pickup truck bed 11. The user then slides the body 20 along the slots 40 until the apparatus 10 abuts the back 17 of the pickup truck cab 18, and locks the body 20 into place. Upon arrival at a job site, the user un-secures the body 20, and slides the apparatus 10 towards the tailgate 18 of the pickup truck 12. The user can then lift the apparatus 10 by the handles 27, and remove the body 20 from the bed 11 of the pickup truck 12. The user can then extend the wheels 48 and push or pull the apparatus 10 to the desired location, and once there, extend the stand 51 to support the apparatus 10 on the ground surface. Alternatively, the user can leave the apparatus 10 within the bed 11 of the pickup truck 12 and retrieve tools as needed therefrom.

The ability of a user to extend the wheels 48 toward a ground surface provides the unexpected benefit of allowing a user to transport a loaded apparatus 10 along a ground surface without the need for another to help. In addition, the cooperation of the stand 51 and the wheels 48 to support the apparatus 10 on a ground surface provides convenient access to the tools stored within the apparatus 10 while same is removed from the bed 11 of the pickup truck 12. Also, the ability of a user to bias the wheels 48 and the stand 51 inwardly while the body 20 is resting within the bed 11 of a pickup truck 12 prevents damage to same while the apparatus 10 is secured to the pickup truck bed 11. Further, the ability of a user to secure an existing ladder 14, or other item, to the lid 25 allows a user to more efficiently organize and transport items to and from a job site. All of these advantages overcome the prior art shortcomings.

A method for storing and transporting tools to and from a work area includes the steps of providing a body 20 including vertically stacked top 21, middle 22, and bottom 23 sections respectively, independently locking the compartments 35 such that selected ones of the compartments 35 may be accessed while remaining ones of the compartments 35 are locked, transporting and supporting the body 20 along a ground surface when the body 20 is removed from the pickup truck bed 11 such that the body 20 is maintained in a substantially horizontal position above a ground surface when the body 20 is removed from the pickup truck bed 11, and linearly positioning a plurality of drawers 34 within the compartments 35 formed within the bottom section 23 for housing various objects placed therein by a user.

The body 20 is elevated above a bottom surface 13 of the pickup truck bed 11 during transport, and the top section 21 includes a base 24 with a lid 25 pivotally attached thereto. Such a base 24 defines a hollow cavity 26 therein, and the lid 25 fully encloses the cavity 26 when the lid 25 is biased forwardly and downwardly toward the base 20. The middle section 22 is disposed below the top section 21, is monolithically formed with the top section 21, and has a top surface 32 defining a bottom surface 33 of the top section 21. The bottom section 23 is disposed below the middle section 22, is monolithically formed with the middle section 22, and has a top surface 42 defining a bottom surface 43 of the middle section 22. Each of the top, middle and bottom sections 21, 22, 23 includes isolated compartments 35 for housing objects therein.

The method further includes the steps of attaching a locking apparatus 45 to an outer surface of the base 20, the lid 25, and the drawers 34 respectively, providing a key for locking and unlocking the locking apparatus 45, inwardly pivoting a plurality of wheels 45 located at a distal end 50 of the body 20 such that the wheels 48 are biased inwardly toward a centrally registered longitudinal axis of the body 20 and upwardly toward a bottom surface 47 of the body 20 when the body 20 is secured to the pickup truck bed 11, horizontally laying the wheels 48 adjacent to the bottom surface 47 when the wheels 48 are biased toward the longitudinal axis of the body 20, and horizontally biasing the stand 51 inwardly toward the wheels 48 and upwardly toward the bottom surface 47 when the body 20 is secured to the pickup truck bed 11.

The U-shaped stand 51 is located at a proximal end 52 of the body 20 and oppositely seated from the wheels 48, and lays horizontally adjacent to the bottom surface 47 when biased toward the wheels 48. The wheels 48 are pivotally attached to the bottom surface 47 and extend downwardly away therefrom and toward a ground surface during transport, while the stand 51 has an open end 53 pivotally attached to the bottom surface 47 and a closed end 54 formed oppositely of the open end 53. The wheels 48 cooperate with the stand 51 to support the body 20 above the ground surface when the body 20 is removed from the pickup truck bed 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable tool storage container for use in a bed of a pickup truck for assisting a user to efficiently store and easily transport tools to and from a work area, said tool storage container comprising:
   a body including vertically stacked top, middle, and bottom sections respectively;
   said top section including a base with a lid pivotally attached thereto, said base defining a hollow cavity therein, said lid fully enclosing said cavity when said lid is biased forwardly and downwardly toward said base;
   said middle section being disposed below said top section, said middle section being monolithically formed with said top section and having a top surface defining a bottom surface of said top section;
   said bottom section being disposed below said middle section, said bottom section being monolithically formed with said middle section and having a top surface defining a bottom surface of said middle section;
   each of said top, middle and bottom sections including isolated compartments for housing objects therein;
   means for independently locking said compartments such that selected ones of said compartments may be accessed while remaining ones of said compartment are locked; and
   means for transporting and supporting said body along a ground surface when said body is removed from the pickup truck bed, said body transporting and supporting means further supporting said body in a substantially horizontal position above a ground surface when said body is removed from the pickup truck bed, said body transporting and supporting means being attached to a bottom surface of said body;
   wherein said top section further comprises
   a plurality of handles monolithically formed on outer surfaces of opposite ends of said base, said handles being oriented perpendicular to a longitudinal length of said body and resting exterior of the pickup truck bed so that the user can lift and remove said body while standing exterior of the pickup truck bed; and
   left and right fastening members integrally attached to a top surface of said lid for securing an existing ladder to said lid, said left and right fastening members being hook-shaped and linearly displaceable along the longitudinal length of said body, said left and right fastening members facing opposite directions and toward said opposite ends of said base, said left and right fastening members projecting upwardly from said top surface of said lid and oriented at a right angle thereto.

2. The tool storage container of claim 1, wherein said middle section further comprises:
   a plurality of drawers slidably positioned within a front face of said compartments of said middle section and displaceable along a path defined orthogonally to the longitudinal length of said base;
   a plurality of linear and coextensively shaped guide rails attached along vertical sidewalls of said pickup truck bed, each of said guide rails being provided with a linear slot formed within an interior face thereof and extending along a major longitudinal length of said pickup truck bed; and
   a plurality of flange members monolithically formed on outer surfaces of opposite ends of said middle section, said flange members being oriented parallel to the longitudinal length of said body, said flange members being slidably interfitted directly within said slots such that a travel path of said body is defined by respective lengths of said slots and said body is thereby prohibited from vertically oscillating during transport.

3. The tool storage container of claim 1, wherein said bottom section further comprises:
   a plurality of drawers linearly positioned within said compartments formed within said bottom section for housing various objects placed therein by a user.

4. The tool storage container of claim 1, wherein said locking means comprises:
   a locking apparatus attached to an outer surface of said base and said lid and said drawers respectively, and
   a key for locking and unlocking said locking apparatus of said base and said lid and said drawers respectively.

5. The tool storage container of claim 1, wherein said transporting and supporting means comprises:
   a plurality of wheels located at a distal end of said body, said wheels being pivotally attached to a bottom surface of said bottom section and extending downwardly away therefrom and toward a ground surface during transport, said wheels being biased inwardly toward a centrally registered longitudinal axis of said body and upwardly toward said bottom surface when said body is secured to the pickup truck bed, said wheels laying horizontally adjacent to said bottom surface when biased toward the longitudinal axis of said body; and a U-shaped stand located at a proximal end of said body and oppositely seated from said wheels, said stand having an open end pivotally attached to said bottom surface of said body and a closed end formed oppositely of said open end, said stand being biased inwardly toward said wheels and upwardly toward said bottom surface when said body is secured to the pickup truck bed, said stand laying horizontally adjacent to said bottom surface when biased toward said wheels, said wheels cooperating with said stand to support said body above the ground surface when said body is removed from the pickup truck bed.

6. A portable tool storage container for use in a bed of a pickup truck for assisting a user to efficiently store and easily transport tools to and from a work area, said tool storage container comprising:

a body including vertically stacked top, middle, and bottom sections respectively, wherein said body is elevated above a bottom surface of the pickup truck bed during transport;

said top section including a base with a lid pivotally attached thereto, said base defining a hollow cavity therein, said lid fully enclosing said cavity when said lid is biased forwardly and downwardly toward said base;

said middle section being disposed below said top section, said middle section being monolithically formed with said top section and having a top surface defining a bottom surface of said top section;

said bottom section being disposed below said middle section, said bottom section being monolithically formed with said middle section and having a top surface defining a bottom surface of said middle section;

each of said top, middle and bottom sections including isolated compartments for housing objects therein;

means for independently locking said compartments such that selected ones of said compartments may be accessed while remaining ones of said compartment are locked; and means for transporting and supporting said body along a ground surface when said body is removed from the pickup truck bed, said body transporting and supporting means further supporting said body in a substantially horizontal position above a ground surface when said body is removed from the pickup truck bed, said body transporting and supporting means being attached to a bottom surface of said body;

wherein said top section further comprises a plurality of handles monolithically formed on outer surfaces of opposite ends of said base, said handles being oriented perpendicular to a longitudinal length of said body and resting exterior of the pickup truck bed so that the user can lift and remove said body while standing exterior of the pickup truck bed; and left and right fastening members integrally attached to a top surface of said lid for securing an existing ladder to said lid, said left and right fastening members being hook-shaped and linearly displaceable along the longitudinal length of said body, said left and right fastening members facing opposite directions and toward said opposite ends of said base, said left and right fastening members projecting upwardly from said top surface of said lid and oriented at a right angle thereto.

7. The tool storage container of claim 6, wherein said middle section further comprises:

a plurality of drawers slidably positioned within a front face of said compartments of said middle section and displaceable along a path defined orthogonally to the longitudinal length of said base;

a plurality of linear and coextensively shaped guide rails attached along vertical sidewalls of said pickup truck bed, each of said guide rails being provided with a linear slot formed within an interior face thereof and extending along a major longitudinal length of said pickup truck bed; and a plurality of flange members monolithically formed on outer surfaces of opposite ends of said middle section, said flange members being oriented parallel to the longitudinal length of said body, said flange members being slidably interfitted directly within said slots such that a travel path of said body is defined by respective lengths of said slots and said body is thereby prohibited from vertically oscillating during transport.

8. The tool storage container of claim 6, wherein said bottom section further comprises:

a plurality of drawers linearly positioned within said compartments formed within said bottom section for housing various objects placed therein by a user.

9. The tool storage container of claim 6, wherein said locking means comprises:

a locking apparatus attached to an outer surface of said base and said lid and said drawers respectively, and a key for locking and unlocking said locking apparatus of said base and said lid and said drawers respectively.

10. The tool storage container of claim 6, wherein said transporting and supporting means comprises:

a plurality of wheels located at a distal end of said body, said wheels being pivotally attached to a bottom surface of said bottom section and extending downwardly away therefrom and toward a ground surface during transport, said wheels being biased inwardly toward a centrally registered longitudinal axis of said body and upwardly toward said bottom surface when said body is secured to the pickup truck bed, said wheels laying horizontally adjacent to said bottom surface when biased toward the longitudinal axis of said body; and a U-shaped stand located at a proximal end of said body and oppositely seated from said wheels, said stand having an open end pivotally attached to said bottom surface of said body and a closed end formed oppositely of said open end, said stand being biased inwardly toward said wheels and upwardly toward said bottom surface when said body is secured to the pickup truck bed, said stand laying horizontally adjacent to said bottom surface when biased toward said wheels, said wheels cooperating with said stand to support said body above the ground surface when said body is removed from the pickup truck bed.

11. A method for storing and transporting tools to and from a work area comprising the steps of:

a. providing a body including vertically stacked top, middle, and bottom sections respectively, wherein said body is elevated above a bottom surface of the pickup truck bed during transport, said top section including a base with a lid pivotally attached thereto, said base defining a hollow cavity therein, said lid fully enclosing said cavity when said lid is biased forwardly and downwardly toward said base, said middle section being disposed below said top section, said middle section being monolithically formed with said top section and having a top surface defining a bottom surface of said top section, said bottom section being disposed below said middle section, said bottom section being monolithically formed with said middle section and having a top surface defining a bottom surface of said middle section, each of said top, middle and bottom sections including isolated compartments for housing objects therein;

b. independently locking said compartments such that selected ones of said compartments may be accessed while remaining ones of said compartment are locked; and c. transporting and supporting said body along a ground surface when said body is removed from the pickup truck bed such that said body is maintained in a substantially horizontal position above a ground surface when said body is removed from the pickup truck bed;

wherein said top section further comprises:

a plurality of handles monolithically formed on outer surfaces of opposite ends of said base, said handles being oriented perpendicular to a longitudinal length of said body and resting exterior of the pickup truck bed so that the user can lift and remove said body while standing exterior of the pickup truck bed; and left and right fastening members integrally attached to a top surface of said lid for securing an existing ladder to said lid, said left and right fastening members being hook-shaped and linearly displaceable along the longitudinal length of said body, said left and right fastening members facing opposite directions and toward said opposite ends of said base, said left and right fastening members projecting upwardly from said top surface of said lid and oriented at a right angle thereto.

12. The method of claim 11, wherein said middle section further comprises:

a plurality of drawers within a front face of said compartments of said middle section and displacing said drawers along a path defined orthogonally to the longitudinal length of said base;

a plurality of linear and coextensively shaped guide rails attached along vertical sidewalls of said pickup truck bed, each of said guide rails being provided with a linear slot formed within an interior face thereof and extending along a major longitudinal length of said pickup truck bed; and a plurality of flange members monolithically formed on outer surfaces of opposite ends of said middle section, said flange members being oriented parallel to the longitudinal length of said body, said flange members being slidably interfitted directly within said slots such that a travel path of said body is defined by respective lengths of said slots and said body is thereby prohibited from vertically oscillating during transport.

13. The method of claim 11 further comprising the steps of:

d. linearly positioning a plurality of drawers within said compartments formed within said bottom section for housing various objects placed therein by a user.

14. The method of claim 11, wherein step b comprises the steps of:

i. attaching a locking apparatus to an outer surface of said base and said lid and said drawers respectively, and ii. providing a key for locking and unlocking said locking apparatus of said base and said lid and said drawers respectively.

15. The tool storage container of claim of claim 11, wherein step d comprises the steps of:

i. inwardly pivoting a plurality of wheels located at a distal end of said body such that said wheels are biased inwardly toward a centrally registered longitudinal axis of said body and upwardly toward said bottom surface when said body is secured to the pickup truck bed, said wheels being pivotally attached to a bottom surface of said bottom section and extending downwardly away therefrom and toward a ground surface during transport;

ii. horizontally laying said wheels adjacent to said bottom surface when biased toward the longitudinal axis of said body; and iii. horizontally biasing said stand inwardly toward said wheels and upwardly toward said bottom surface when said body is secured to the pickup truck bed a U-shaped stand located at a proximal end of said body and oppositely seated from said wheels, said stand having an open end pivotally attached to said bottom surface of said body and a closed end formed oppositely of said open end; and iv. horizontally laying said stand adjacent to said bottom surface when biased toward said wheels, said wheels cooperating with said stand to support said body above the ground surface when said body is removed from the pickup truck bed.

* * * * *